UNITED STATES PATENT OFFICE.

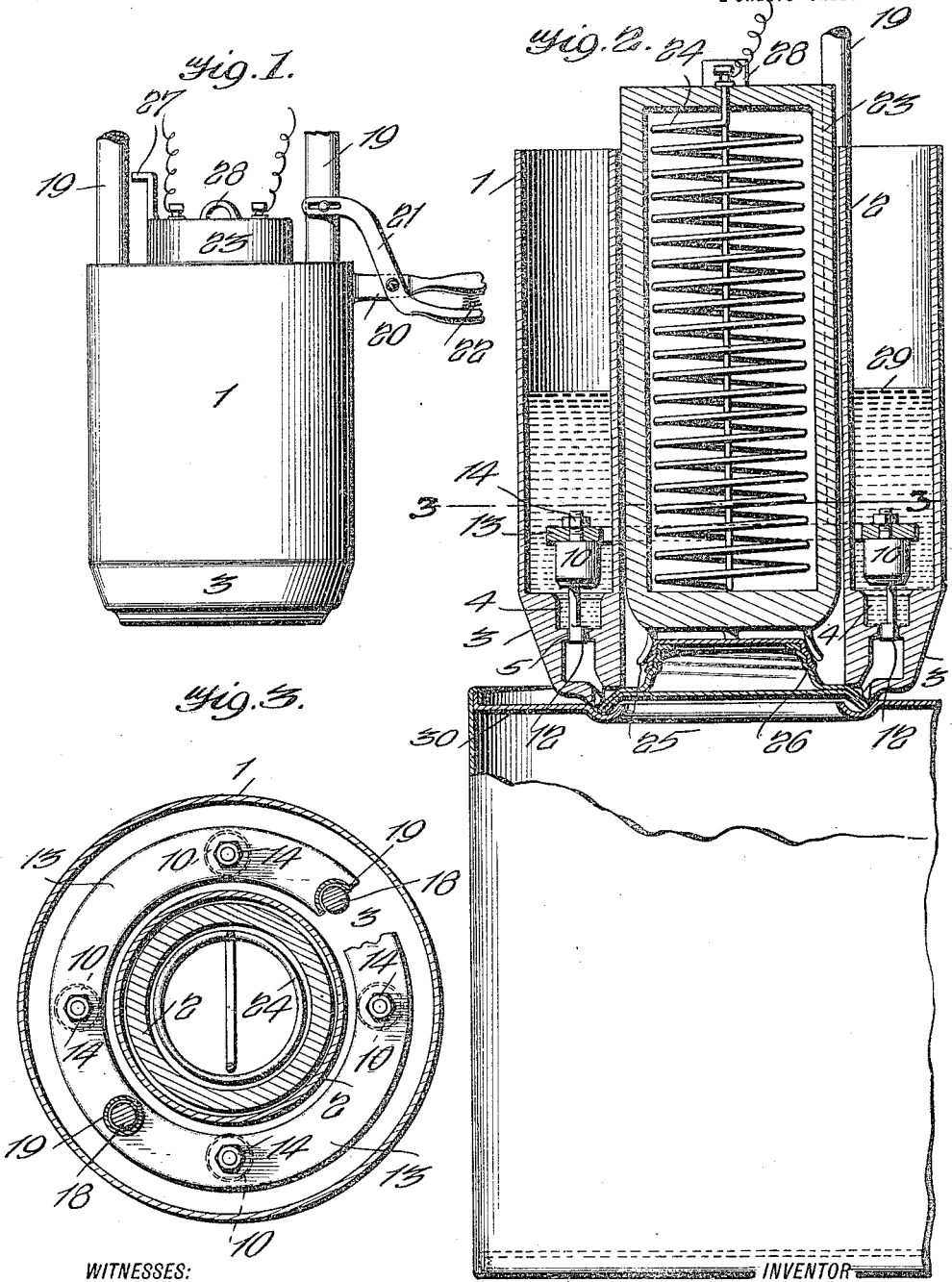

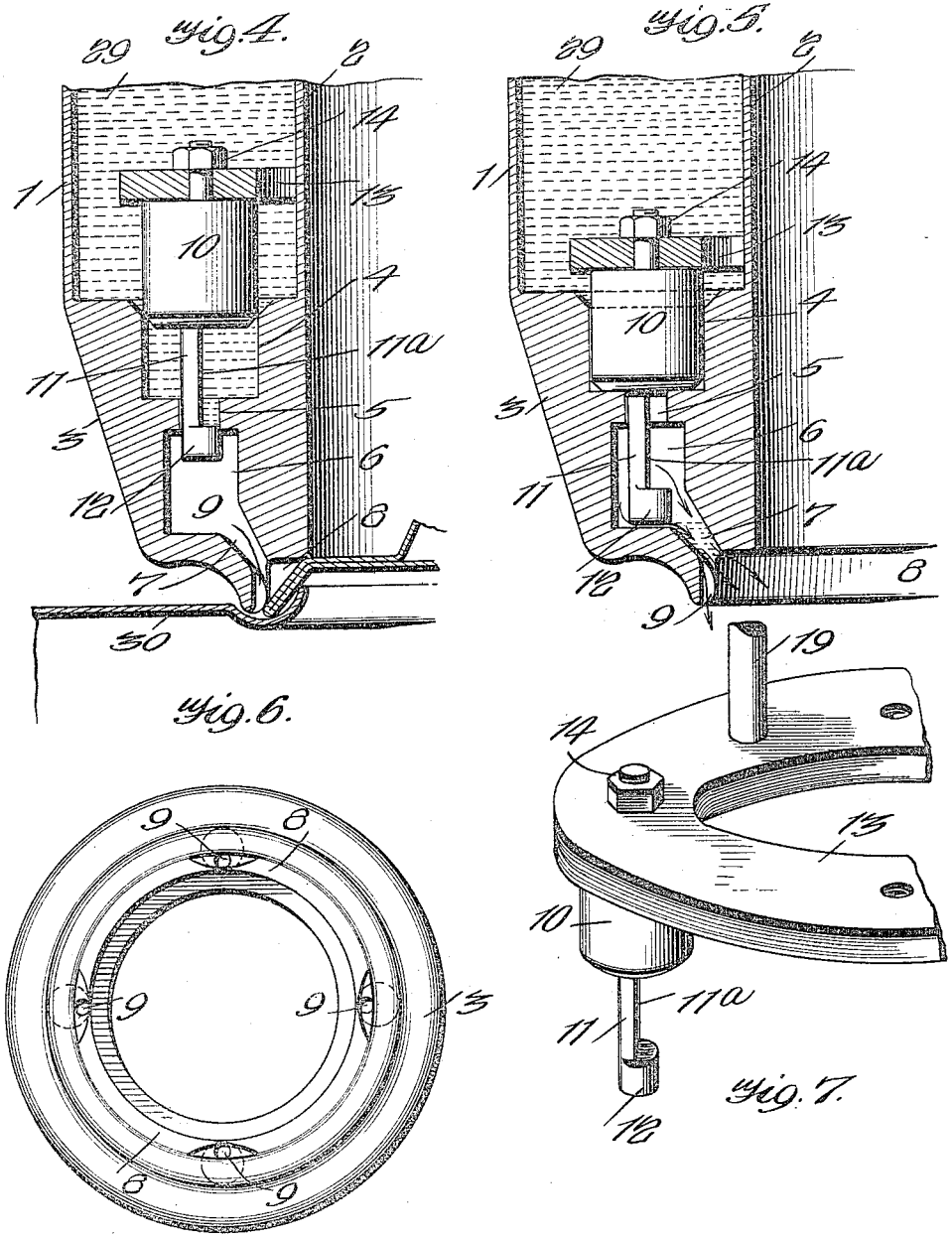

RICHARD C. BRADLEY, OF HOUSTON, TEXAS, ASSIGNOR OF TWO-THIRDS TO C. FRANK IRELAND, OF HOUSTON, TEXAS.

SOLDERING DEVICE.

1,214,420.  Specification of Letters Patent.  Patented Jan. 30, 1917.

Application filed April 18, 1916. Serial No. 91,937.

*To all whom it may concern:*

Be it known that I, RICHARD C. BRADLEY, a citizen of the United States, and a resident of Houston, in the county of Harris and State of Texas, have invented a certain new and useful Improvement in Soldering Devices, of which the following is a specification.

My invention relates to improvements in automatic soldering devices, and it consists in the combinations, constructions, and arrangements herein described and claimed.

An object of my invention is to provide a device which is primarily designed to seal cans, like the oil cans of the export type.

A further object of my invention is to provide a device of the type described which will operate quickly to distribute the solder evenly, thereby rendering the soldering operation less expensive.

A further object of my invention is to provide a device of the class described, in which a container having molten solder is provided with means for discharging the same simultaneously through a number of outlets upon the parts to be soldered, with means for keeping the solder in a molten condition.

Other objects and advantages will appear in the following specification, and the novel features of the invention will be particularly pointed out in the appended claims.

My invention is illustrated in the accompanying drawings forming part of this application, in which—

Figure 1 is a side view of the device. Fig. 2 is an enlarged sectional view. Fig. 3 is a partly broken section along the line 3—3 of Fig. 2. Fig. 4 is an enlarged detail section showing the device in one position. Fig. 5 is a view similar to Fig. 4, showing the device in another position. Fig. 6 is a bottom view of the device, and Fig. 7 is a detail perspective view of a portion of the device.

Referring now particularly to Fig. 2, I have shown therein an outer casing 1, an inner casing 2, and a bottom 3. The bottom 3 is provided with a series of recesses 4, which communicate with the space between the inner and outer casings, each of these recesses communicating by means of a cylindrical passage 5, with a chamber 6. Each of the chambers 6 communicates by means of a passage 7 with a cut away portion 8 at the bottom of the device, which cut away portion is circular in form. The passages 7 have leading downwardly from them, a passage 9, best shown in Figs. 4 and 5. This last passage 9, while not absolutely essential to the proper working of the device, is preferably used. Arranged to fit snugly in the cylindrical recesses 4, are cylinders, such as that shown at 10 in Figs. 4 and 5. Each of these cylinders has a bar or rod 11 extending downwardly from the cylinder and which bears at its lower end a valve 12 of cylindrical shape, which fits the opening 5 snugly. In the present instance, I have shown the rod 11 and the valve 12 as being composed of a single cylindrical rod having a cut away portion 11$^a$, but this is one of the many ways in which it might be constructed.

There is one of the cylinders 10 for each recess 4. These cylinders are carried by a common ring 13 which surrounds the inner casing 2, the cylinders being supported by any suitable means, such as by bolts 14. The ring may be moved by the means hereinafter described, and is guided in its movement by rods 18 which enter tubular guide rods 19. A handle member 20 is attached to the outer casing 1, while a handle member 21 is attached to one of the guide members by means of a slot and pin connection, a spring 22 being interposed between the two handle members, so as to keep the outer ends normally apart.

The device may be heated by any suitable means. In the present instance I have shown an electric heater which comprises a cylindrical casing 23 arranged to enter the inner cylinder or casing 2, the cylinder containing a heating element 24. The bottom of the heater is provided with a number of fingers 25 which engage the cap 26 and hold the latter in position during the soldering operation. The heating cylinder 23 also bears a lug or arm 27 at its top which prevents the heater from sliding entirely through the device, but which allows it to advance far enough to come in contact with the cap 26 before the main body of the device, that is to say, the inner and outer cylinders 1 and 2 and the bottom 3 reach the cap so as to form a guide for the main body while holding the cap in direct line under the main body. A ring 28 is provided at the top of the heating cylinder 23 by means of which it may be lifted.

From the foregoing description of the various parts of the device, the operation thereof may be readily understood. The normal position of the device is that shown in Fig. 2, in which the valves 12 close the openings 5 while the cylinders 10 are above the recesses 4. The reservoir or space between the inner and outer casings is filled with molten solder 29 which runs into the recesses 4. The cap 26 is centered on the can 30, and is held in position by means of the fingers 25, of the heater 23. The handle members 21 and 20 are manipulated so as to force the guide members 19 downwardly, thereby causing the cylinders 10 and the valves 12 to take the position shown in Fig. 4. In this position it will be noted that the recess 4 is now about to be closed, while the opening 5 is about to be opened. Further movement of the guide members 19 will force the ring downwardly bearing the cylinders 10, so that the cylinders will enter the recesses 4, forcing the solder therein out through the openings 5 and into the chamber 6, from whence it runs through the passages 7 and 9 to the points where the soldering is to secure the top to the main body portion. In practice I find that the small passages 9 may be dispensed with, and in such case I give the device a slight rotary movement so as to spread out the solder. Now, when the handles are released, the spring 22 will raise the parts again to the position shown in Fig. 2. In the reverse movement, the valve 12 closes the opening 5 before the solder is admitted to the recess 4. It will thus be seen that on each reciprocation of the cylinders 10, a measured quantity of solder will be fed to the joint which is to be soldered, thus doing away with the ordinary soldering iron, and greatly facilitating the soldering operation.

It is obvious that the central heating cylinder need not be heated by electricity. It might be a solid cylinder heated in any suitable manner and placed in position after heating.

I claim:—

1. The herein described soldering device comprising an inner casing, an outer casing, a bottom common to the two casings, the space between the inner and outer casings constituting a reservoir for solder, said bottom being provided with a plurality of openings, a valve for each opening, a common means for supporting the valves, means for moving said common means to cause the movement of the valves simultaneously, means for keeping the solder in a molten condition, said last named means comprising a cylinder capable of radiating heat, said cylinder being arranged to enter the inner casing, and means carried at the end of the cylinder for engaging and holding a portion of the work to be soldered.

2. A device for soldering can tops comprising an inner cylindrical casing, an outer cylindrical casing, a common bottom supporting the two casings, said bottom being provided with a series of recesses, a cylinder arranged to close the upper part of each of said recesses, a common means for supporting the said cylinders, said means comprising a ring disposed in the space between the inner and outer cylindrical casings, and means for moving the ring to cause the movement of all of said cylinders.

3. A device for soldering can tops comprising an inner cylindrical casing, an outer cylindrical casing, a common bottom supporting the two casings, said bottom being provided with a series of recesses, a cylinder arranged to close the upper part of each of said recesses, a common means for supporting the said cylinders, said means comprising a ring disposed in the space between the inner and outer cylindrical casings, means for moving the ring to cause the movement of all of said cylinders, said soldering device being rotatable around the closure whereby the solder is spread.

RICHARD C. BRADLEY.

Copies of this patent may be obtained for five cents each, by addressing the "Commissioner of Patents. Washington, D. C."